United States Patent
Li et al.

(10) Patent No.: US 11,349,754 B2
(45) Date of Patent: May 31, 2022

(54) PACKET PROCESSING METHOD AND APPARATUS

(71) Applicant: HUAWEI TECHNOLOGIES CO., LTD., Guangdong (CN)

(72) Inventors: Taixin Li, Shenzhen (CN); Zhe Chen, Beijing (CN); Jinlong Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/002,160

(22) Filed: Aug. 25, 2020

(65) Prior Publication Data

US 2020/0389391 A1    Dec. 10, 2020

Related U.S. Application Data

(63) Continuation of application No. PCT/CN2020/072174, filed on Jan. 15, 2020.

(30) Foreign Application Priority Data

Jan. 30, 2019 (CN) .......................... 201910089083.9

(51) Int. Cl.
*H04L 45/00* (2022.01)
*H04L 45/74* (2022.01)
*H04L 69/22* (2022.01)

(52) U.S. Cl.
CPC ............ *H04L 45/34* (2013.01); *H04L 45/74* (2013.01); *H04L 69/22* (2013.01)

(58) Field of Classification Search
CPC combination set(s) only.
See application file for complete search history.

(56) References Cited

U.S. PATENT DOCUMENTS 10,158,558 B1    12/2018 Ward et al.
2004/0236720 A1*  11/2004 Basso ................. H04L 45/00
(Continued)

FOREIGN PATENT DOCUMENTS

CN    106411738 A    2/2017
CN    107566272 A    1/2018
(Continued)

OTHER PUBLICATIONS

C. Filsfils, Ed.:"Segment Routing Architecture", RFC8402, Jul. 2018, total 32 pages.
(Continued)

*Primary Examiner* — Xavier S Wong
(74) *Attorney, Agent, or Firm* — Womble Bond Dickinson (US) LLP

(57) ABSTRACT

The present disclosure provides a packet processing method, including: determining, by a first node, a first packet, where both a packet header and a segment routing header (SRH) of the first packet include a shared SID, the shared SID includes a first address identifier and a first function identifier, the first address identifier is used to identify address information of a terminating node, and the first function identifier is used to identify a same first function that needs to be performed by at least two nodes. If a plurality of nodes need to perform the same first function, the shared SID in the SRH can replace SIDs of all of the plurality of nodes. In this way, SID overheads can be reduced to save bandwidth resources, thereby helping improve system performance.

20 Claims, 8 Drawing Sheets

(56) References Cited

U.S. PATENT DOCUMENTS

| | | | | |
|---|---|---|---|---|
| 2016/0335296 A1* | 11/2016 | Sathe | ...................... | H04L 45/74 |
| 2018/0375768 A1* | 12/2018 | Previdi | ................. | H04L 45/507 |
| 2019/0394211 A1* | 12/2019 | Filsfils | ................... | H04L 45/34 |
| 2020/0099610 A1* | 3/2020 | Heron | ..................... | H04L 45/04 |

FOREIGN PATENT DOCUMENTS

| | | |
|---|---|---|
| CN | 107925624 A | 4/2018 |
| CN | 108156077 A | 6/2018 |
| WO | 2017141081 A1 | 8/2017 |
| WO | 2019005956 A1 | 1/2019 |
| WO | 2019011114 A1 | 1/2019 |

OTHER PUBLICATIONS

C. Filsfils:SRv6 Network Programming,draft-filsfils-spring-srv6-network-programming-05, Jul. 2, 2018, total 53 pages.
C. Filsfils, Ed.:IPv6 Segment Routing Header (SRH), draft-ietf-6man-segment-routing-header-14, Jun. 29, 2018, total 15 pages.
S. Previdi:IPv6 Segment Routing Header (SRH), draft-ietf-6man-segment-routing-header-12, Apr. 19, 2018, total 28 pages.

\* cited by examiner

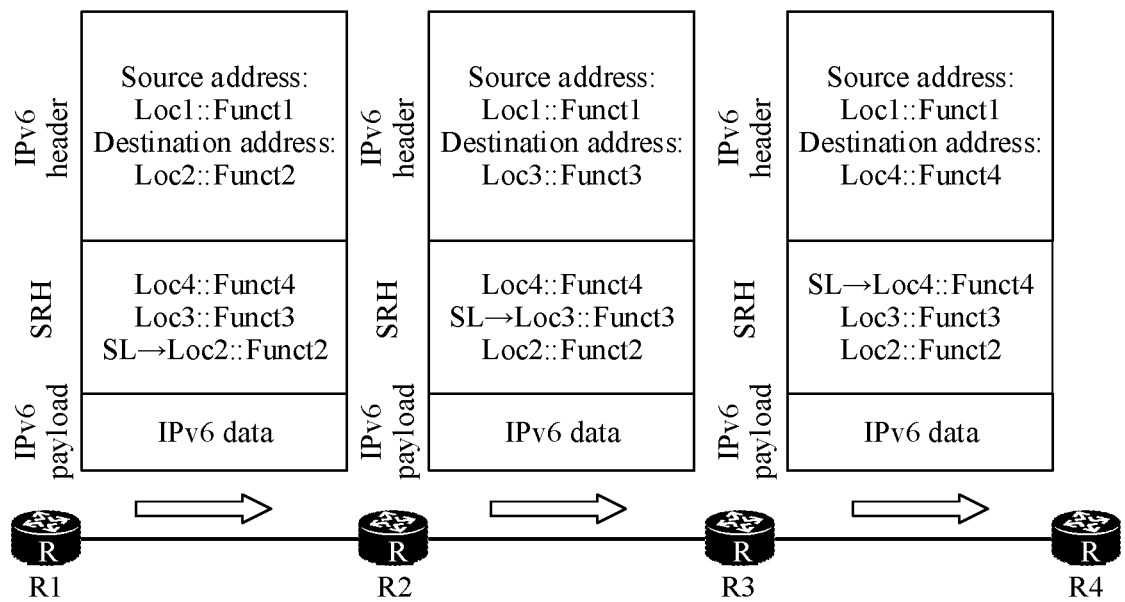

FIG. 1

A first node determines a first packet, where both a packet header and an SRH of the first packet include a shared segment identifier SID, the shared SID includes a first address identifier and a first function identifier, the first address identifier is used to identify address information of a terminating node, and the first function identifier is used to identify a same first function that needs to be performed by at least two nodes ~ S110

The first node determines, based on a first correspondence and the first function identifier, to perform the first function, where the first correspondence is used to indicate that at least one function identifier is in a one-to-one correspondence with at least one function ~ S120

FIG. 3

PACKET PROCESSING METHOD AND APPARATUS

CROSS-REFERENCE TO RELATED APPLICATIONS

This application is a continuation of International Application No. PCT/CN2020/072174, filed on Jan. 15, 2020, which claims priority to Chinese Patent Application No. 201910089083.9, filed on Jan. 30, 2019. The disclosures of the aforementioned applications are hereby incorporated by reference in their entireties.

TECHNICAL FIELD

The present disclosure relates to the communications field, and more specifically, to a packet processing method and apparatus in the communications field.

BACKGROUND

In a current internet protocol version 6 (IPv6), a segment routing (SR) technology is used for packet forwarding, and a source node uses a sequential segment identifier (SID) as an instruction to instruct packet forwarding. In a packet, a SID set is referred to as a segment routing header (SRH). A SID includes two fields: a locator field and a function field. The location field is an address prefix of a node and is used to identify a node to which the packet is routed and that needs to perform a function, the function field is used to identify a network function that needs to be performed, and a sequential segment is used as an instruction to instruct packet forwarding. When each node on a path needs to perform a corresponding function, a packet header of a packet needs to carry a SID of the node along the path in an SRH of the packet. When there are a relatively large quantity of nodes on the path, a SID scale of the SRH increases. Even if the nodes along the path perform a same function, the SIDs of the nodes still need to be carried in the SRH. This increases overheads and reduces utilization of network bandwidth, thereby affecting system performance.

SUMMARY

The present disclosure provides a packet processing method and apparatus, to help improve system performance.

According to a first aspect, a packet processing method is provided, including: determining, by a first node, a first packet, where both a packet header and a segment routing header (SRH) of the first packet include a shared segment identifier (SID), the shared SID includes a first address identifier and a first function identifier, the first address identifier is used to identify address information of a terminating node, and the first function identifier is used to identify a same first function that needs to be performed by at least two nodes; and determining, by the first node based on a first correspondence and the first function identifier, to perform the first function, where the first correspondence is used to indicate that at least one function identifier is in a one-to-one correspondence with at least one function, and the at least one function includes the first function.

Therefore, in the present disclosure, if a plurality of nodes need to perform the same first function, the shared SID in the SRH can replace SIDs of all of the plurality of nodes. In this way, SID overheads can be reduced to save bandwidth resources, thereby helping improve system performance.

It should be noted that if the first node determines to perform the first function, the first node performs the first function.

In the present disclosure, the first correspondence is used to indicate that the at least one function identifier is in a one-to-one correspondence with the at least one function. For example, the SID may be a function identifier, or a unified function identifier on an entire network may be used to identify a function. Specific content of the first correspondence is not limited in the present disclosure, provided that a function can be identified.

In the present disclosure, the first node may be a source node, an intermediate node, or a terminating node (that is, the last node on a forwarding path).

For example, the first function may be rate limiting, operation, administration, and maintenance (OAM), and forwarding information base (FIB) lookup.

In some implementations, the first correspondence is specifically used to indicate that at least one SID is in a one-to-one correspondence with the at least one function, and the at least one SID includes the shared SID; and the determining, by the first node based on a first correspondence and the first function identifier, to perform the first function includes: determining, by the first node based on the first correspondence and the shared SID, to perform the first function.

In the present disclosure, the first node locally stores the first correspondence, each node on the forwarding path stores a correspondence of the node, and correspondences of the nodes may be identical or different. This is not limited in this embodiment of the present disclosure.

In some implementations, the determining, by the first node based on a first correspondence and the first function segment identifier, to perform the first function includes: determining, by the first node, whether there is the first function identifier in the first correspondence; and if there is the first function identifier in the first correspondence, determining, by the first node based on the first correspondence and the first function identifier, to perform the first function; and if there is no first function identifier in the first correspondence, determining, by the first node, to skip performing the first function.

In some implementations, if there is the first function identifier in the first correspondence, the method further includes:

determining, by the first node, that a value of segments left (SL) in the SRH remains unchanged.

In some implementations, the determining, by the first node, whether there is the first function identifier in the first correspondence includes: determining, by the first node, whether the value of the segments left (SL) in the SRH is greater than 0; and if the value of the SL is greater than 0, determining, by the first node, whether there is the first function identifier in the first correspondence.

In some implementations, the first function is rate limiting, operation, administration, and maintenance, or forwarding information base lookup.

In some implementations, after the determining, by the first node based on a local first correspondence and the first function identifier, to perform the first function, the method further includes: forwarding, by the first node, the first packet to a second node according to a shortest path, where the at least two nodes include the first node and the second node.

In some implementations, if the first node is a source node, the determining, by a first node, a first packet includes:

receiving, by the first node, encapsulation configuration information sent by a controller; and generating and encapsulating, by the first node, the first packet based on the encapsulation configuration information.

In some implementations, if the first node is the terminating node, and the determining, by a first node, a first packet includes:

receiving, by the first node, the first packet sent by a previous-hop node; and after the determining, by the first node based on a first correspondence and the first function identifier, to perform the first function, the method further includes: decapsulating, by the first node, the first packet.

According to a second aspect, a packet processing method is provided, and may be performed by a controller. The method includes at least one of the following operations:

determining, by the controller, a plurality of nodes on a forwarding path that perform a first function, where the plurality of nodes include a source node, at least one intermediate node, and a terminating node;

generating, by the controller, a shared SID based on a first address identifier and a first function identifier, where the first address identifier is used to identify address information of the terminating node, and the first function identifier is used to identify the first function;

sending, by the controller, encapsulation configuration information to the source node, where the encapsulation configuration information includes the shared SID, so that the source node generates a first packet based on the encapsulation configuration information;

sending, by the controller, the shared SID to each of the at least one intermediate node, so that each intermediate node stores the shared SID; and sending, by the controller, decapsulation configuration information to the terminating node, where in one embodiment, the decapsulation configuration information may include the shared SID; and certainly, the decapsulation configuration information may alternatively not include the shared SID.

In one embodiment, on the forwarding path, there may be several nodes that do not perform the first function. For example, the several nodes include the terminating node.

According to a third aspect, a packet processing apparatus is provided. The apparatus includes units configured to perform the operations in the method in each aspect or any possible implementation of the aspect.

According to a fourth aspect, a packet processing apparatus is provided. The apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. When the processor executes the instruction stored in the memory, the execution enables the processor to perform the method in the first aspect or any possible implementations of the first aspect.

According to a fifth aspect, a computer program product is provided. The computer program product includes a computer program; and when being executed by a processor, the computer program is used to perform the method in each aspect or any possible implementation of the aspect.

According to a sixth aspect, a computer-readable storage medium is provided. The computer-readable storage medium stores a computer program; and when being executed, the computer program is used to perform the method in each aspect or any possible implementation of the aspect.

BRIEF DESCRIPTION OF DRAWINGS

FIG. 1 is a schematic diagram of an SRv6 forwarding mechanism;

FIG. 2 is a schematic diagram of a format of a shared SID according to an embodiment of the present disclosure;

FIG. 3 is a schematic diagram of a packet processing method according to an embodiment of the present disclosure;

DESCRIPTION OF EMBODIMENTS

Figure 4:
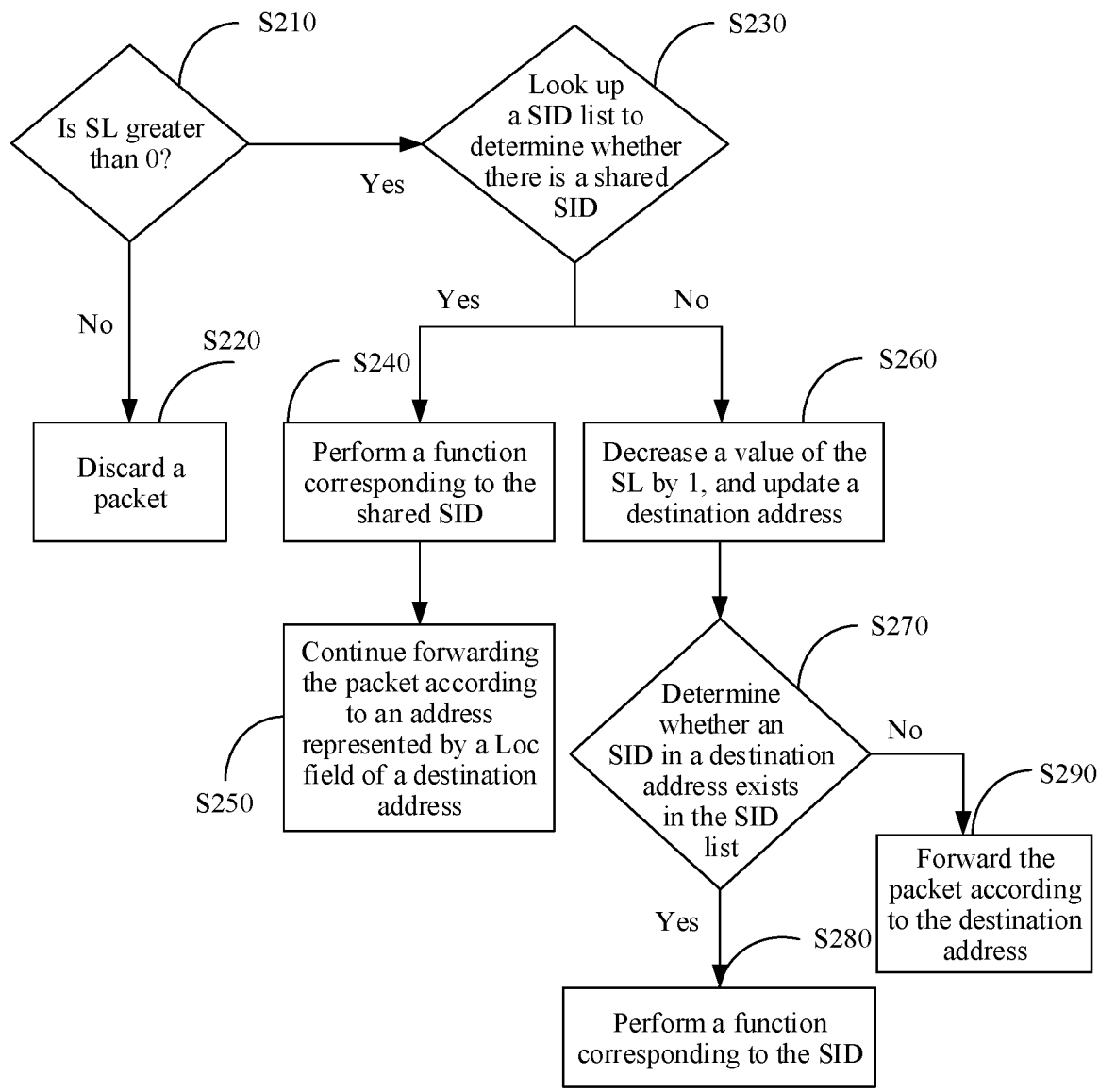
FIG. 4 is a schematic diagram of another packet processing method according to an embodiment of the present disclosure.

The IPv6 protocol is used as an example for description in the embodiments of the present disclosure. However, the embodiments of the present disclosure are not limited thereto. For example, the embodiments of the present disclosure may alternatively be used in the internet protocol version 4 (IPv4) protocol.

For ease of description, in the present disclosure, Loc is used to represent a locator field, and Funct is used to represent a function field.

When the IPv6 protocol is used, an SR technology is SRv6. FIG. 1 shows an SRv6 forwarding mechanism. An SRv6 packet includes three main parts: an IPv6 header, an SRH, and a payload. Starting from R1, the packet is forwarded to R4 along a path R1-R2-R3-R4. When the packet is sent from R1, a source address field in the IPv6 header is Loc1::Funct1, that is, Loc1::Funct1 is a SID of R1; and a destination address field is Loc2::Funct2, that is, Loc2::Funct2 is a SID of R2. The SRH includes Loc2::Funct2, Loc3::Funct3, and Loc4::Funct4, that is, SIDs of nodes R2, R3, and R4. In this case, a value of an SL is 2, and a pointer points to Loc2::Funct2. The payload part is IP data. Because a destination address is the SID of R2, the packet is forwarded to R2.

After the packet arrives at the node R2, the node R2 performs a function represented by Funct2. Then, the value of the SL is decreased by 1, the pointer points to Loc3::Funct3, the destination address field in the IPv6 header of the packet is replaced with Loc3::Funct3, and other fields remain unchanged. Because a destination address is the SID of R3, the packet is forwarded to R3.

After the packet arrives at the node R3, the node R3 performs a function represented by Funct3. Then, the value of the SL is decreased by 1, the pointer points to Loc4::Funct4, the destination address field in the IPv6 header of the packet is replaced with Loc4::Funct4, and other fields remain unchanged. Because a destination address is the SID of R4, the packet is forwarded to R4.

The foregoing forwarding mechanism has the following problems:

1. When a node performs a function, a SID of the node needs to be carried in an SRH. When there are a relatively large quantity of nodes along a path, a SID scale of the SRH increases, and a SID stack needs to be carried, resulting in relatively high overheads. Even if all the nodes on the path perform a same function, SIDs of the nodes still need to be carried in the SRH. This occupies a relatively large quantity of bandwidth resources, thereby affecting system performance.

2. During encapsulation of a packet on a source node (R1), specific nodes along a path need to be known in advance, and SIDs of the nodes along the path need to be encapsulated into an SRH. However, if the nodes along the path cannot be known in advance, the packet cannot be forwarded, and consequently the node cannot perform a corresponding function.

3. When a SID stack is relatively large because there are a relatively large quantity of nodes along a path, and if a network processor (NP) reads a byte of a fixed length each time, a quantity of bytes read and processed by the NP each time is less than a quantity of bytes in the SID stack in an SRH. In this case, it is more difficult for the NP to perform reading.

To resolve the foregoing problems, the embodiments of the present disclosure provide a packet forwarding method, and propose a shared SID. When at least two nodes along a path need to perform a same function, the at least two nodes along the path may share one SID. FIG. 2 shows a format of the shared SID. The shared SID includes two parts: an L-bit address field (also referred to as a Loc field) and an M-bit function field (also referred to as a Funct field), where L and M are positive integers. The address field of the shared SID is address information (for example, may be an entire address or an address prefix) of a terminating node corresponding to a packet, and the function field is an identifier of a network function that needs to be performed by a node along the path. In one embodiment, the function field may further include a parameter (arguments, Args) field, that is, a parameter for performing a function corresponding to the function field. For example, the function corresponding to the function field is rate limiting, and the parameter may be a specific traffic rate. For example, the shared SID may be C4::100:500, where C4 is an address field, 100:500 is a function field, 100 is an identifier of a rate limiting function, and 500 indicates that a traffic rate is limited to 500 kB/s. In one embodiment, L+M=128. Values of L and M may be set depending on an actual case. For example, L and M may be 64, that is, a length of the address field is the same as a length of the function field. In one embodiment, the shared SID may be carried at a stack top of a SID stack. However, a location of the shared SID in the SID stack is not limited in the embodiments of the present disclosure.

With reference to the accompanying drawings, the following describes the packet processing method provided in the embodiments of the present disclosure. In the foregoing, the address field and the function field are used to describe the shared SID. Actually, a bit value carried in an address field may be referred to as an address identifier, and a bit value carried in a function field may be referred to as a function identifier.

FIG. 3 shows a packet processing method 100 according to an embodiment of the present disclosure. The method includes the following operations:

Operation S110. A first node determines a first packet, where both a packet header and an SRH of the first packet include a shared segment identifier (SID), the shared SID includes a first address identifier and a first function identifier, the first address identifier is used to identify address information of a terminating node, and the first function identifier is used to identify a same first function that needs to be performed by at least two nodes.

It should be noted that the shared SID is a destination address in the packet header of the first packet. Further, packet headers of all nodes on a forwarding path that perform the same first function are the same. For example, a source address of the packet header is an address of a source node, and a destination address of the packet header is an address of the terminating node. In other words, if a plurality of nodes perform a same function, when the plurality of nodes receive the first packet, the packet header of the first packet is identical.

Operation S120. The first node determines, based on a first correspondence and the first function identifier, to perform the first function, where the first correspondence is used to indicate that at least one function identifier is in a one-to-one correspondence with at least one function. In one embodiment, the at least one function includes the first function.

In one embodiment, the first node may be a source node on the forwarding path, and is configured to encapsulate the first packet. In one embodiment, the first node may alternatively be an intermediate node on the forwarding path, and is configured to receive a packet from a previous-hop node and forward the packet to a next-hop node. In one embodiment, the first node may alternatively be a destination node on the forwarding path that may also be referred to as a terminating node, and is configured to receive a packet from a previous-hop node and decapsulate the packet.

It should be noted that in this embodiment of the present disclosure, a controller may control nodes on the forwarding path together, some nodes on the forwarding path may perform the same first function, and the remaining nodes may not perform the first function. For the nodes on the forwarding path that perform the first function, the controller generates a shared SID for these nodes. For example, the controller generates the shared SID based on the first address identifier and the first function identifier, and the controller sends encapsulation configuration information to a source node that performs the first function and that is on the forwarding path. The encapsulation configuration information includes the shared SID. In this way, the source node can generate the first packet based on the shared SID, and the source node can store a correspondence between the shared SID and a function identified by the shared SID. Further, the controller may further send the shared SID to an intermediate node that performs the first function and that is on the forwarding path. In this way, the intermediate node can store the correspondence between the shared SID and the function identified by the shared SID. The controller may further send decapsulation configuration information to the terminating node on the forwarding path. In one embodiment, the decapsulation configuration information may include the shared SID. In this way, the terminating node can store the correspondence between the shared SID and the function identified by the shared SID, so that the terminating node can perform the function identified by the shared SID, and decapsulate the packet based on the decapsulation configuration information.

Certainly, in this embodiment of the present disclosure, the controller may further send a function identifier to the source node, the intermediate node, and the terminating node. The source node, the intermediate node, and the terminating node may locally store a correspondence between the function identifier and a function. In this way, when the source node, the intermediate node, and the terminating node are receiving the first packet, the source node, the intermediate node, and the terminating node may determine, based on the function identifier of the shared SID in the SRH of the packet, corresponding functions that need to be performed. Details are not described herein in this embodiment of the present disclosure.

If the first node is a source node or an intermediate node, after S120, the method 100 further includes: forwarding, by the first node, the first packet to a second node according to a shortest path, where the at least two nodes include the first node and the second node. If the first node is the terminating node, the first node does not need to forward the first packet.

In one embodiment, if the first node is a source node, the first node may not only perform the method 100, but also receive the encapsulation configuration information sent by the controller. The controller herein is an entire network controller that controls each node in a network topology structure. The first node may generate and encapsulate the first packet based on the received encapsulation configuration information. Correspondingly, if the first node is the terminating node, the first node may receive the first packet sent by a previous-hop node; and after S120, the first node decapsulates the first packet.

It should be noted that each node may locally store a first correspondence of the node. In the present disclosure, only the first node is used as an example for description. Each of the at least one function has a corresponding identifier, where the identifier is referred to as a function identifier. For example, the function identifier may be a SID. In this case, the first correspondence is used to indicate that each of at least one SID is in a one-to-one correspondence with each of the at least one function. For example, it is assumed that the first correspondence is listed in Table 1. The first column lists all SIDs, and the second column lists functions corresponding to all the SIDs. As listed in Table 1, three SIDs are corresponding to three functions, a SID1 (Loc1::Funct1) is corresponding to a function 1, a SID2 (Loc2::Funct2) is corresponding to a function 2, and a shared SID (Loc::Funct) is corresponding to a function 3. The shared SID may be a SID shared by nodes on the forwarding path, and the function 3 corresponding to the shared SID is a function that needs to be performed by each of the at least two nodes. Assuming that N nodes on the forwarding path all need to perform the function 3, each of the N nodes locally stores content similar to that in the third row. For another example, the first correspondence is listed in Table 2. 100, 50, and 20 in the first column are identifiers of all functions, 100 is used to identify a function 4, 50 is used to identify a function 5, and 20 is used to identify a function 6. For example, the function 4 is rate limiting, the function 5 is OAM, and the function 6 is forwarding information base lookup.

TABLE 1

| Loc1:: Funct1 (SID1) | Function 1 |
| Loc2:: Funct2 (SID2) | Function 2 |
| Loc: Funct (shared SID) | Function 3 |
| ... | ... |

TABLE 2

| 100 | Function 4 |
| 50 | Function 5 |
| 20 | Function 6 |
| ... | ... |

For example, it is assumed that the first correspondence is listed in Table 1. The packet header of the first packet includes the shared SID, and the shared SID includes Loc::Funct. Loc is the first address identifier, and Funct is the first function identifier. Loc is an address or an address prefix of the destination node on the forwarding path, that is, an address or an address prefix of the last node on the path. Funct identifies the same function 3 that needs to be performed by a plurality of nodes on the forwarding path. The first node looks up Table 1 of a local packet based on the shared SID, and determines that a function corresponding to the shared SID is the function 3. In this case, if the first node determines the function 3 that needs to be performed, the first node performs the function 3.

For example, it is assumed that the first correspondence is listed in Table 2. The packet header of the first packet includes the shared SID, and the shared SID includes Loc::Funct. Loc is the first address identifier, and Funct is the first function identifier. Loc is an address or an address prefix of the destination node on the forwarding path, that is, an address or an address prefix of the last node on the path. Funct identifies the same function 3 that needs to be performed by a plurality of nodes on the forwarding path. The first node looks up Table 2 based on the first function identifier (Funct) in the function SID. Assuming that the first function identifier (Funct) is 100, the first node determines the function 4 that needs to be performed and that is corresponding to 100.

The following describes, in two cases, the packet processing method provided in this embodiment of the present disclosure. In a first case, the first correspondence is specifically used to indicate that at least one SID is in a one-to-one correspondence with at least one function, and the at least one SID includes the shared SID. In a second case, the first correspondence is used to indicate that at least one function identifier is in a one-to-one correspondence with at least one function. In the first case and the second case, both the packet header and the SRH of the first packet include the shared SID, and the shared SID in the packet header is a destination address.

In the first case, as shown in FIG. 4, the following process is included:

Operation S210. A first node determines whether a value of an SL in an SRH of a first packet is greater than 0.

Operation S220. If the value of the SL in the SRH is equal to 0, and the current node is the last node, the current node does not need to forward the first packet, but needs to perform a decapsulation operation.

Operation S230. If the value of the SL in the SRH is greater than 0, the first packet further needs to be forwarded to a next node, and the first node determines, through lookup based on a locally stored SID list, whether there is a shared SID. The SID list herein may also be referred to as a first correspondence, for example, may be in a form in Table 1.

Operation S240. If the first node determines, based on the locally stored SID list, that there is a shared SID, the first node determines a function corresponding to the shared SID, and the first node performs the function. In addition, in this case, the value of the SL in the SRH of the first packet remains unchanged.

Operation S250. After S240 is performed, the first node continues forwarding the packet according to an address represented by an address segment (Loc segment) of a destination address in a packet header.

Operation S260. If the first node determines, based on the locally stored SID list, that there is no shared SID, the first node decreases the value of the SL in the SRH by 1, and updates a destination address in a packet header to a SID to which the SL minus 1 points, that is, the SID to which the SL minus 1 points is the destination address.

Operation S270. The first node determines whether the SID in the destination address (that is, the SID to which the SL minus 1 points) exists in the locally stored SID list, and if the SID in the destination address exists in the locally stored SID list, the first node performs a function corresponding to the SID to which the SL minus 1 points.

Operation S280. If there is the SID in the destination address in the locally stored SID list in S270, perform the function corresponding to the SID.

Operation S290. If there is no SID in the destination address in the locally stored SID list in S270, the first node forwards the first packet according to the destination address.

Figure 5:
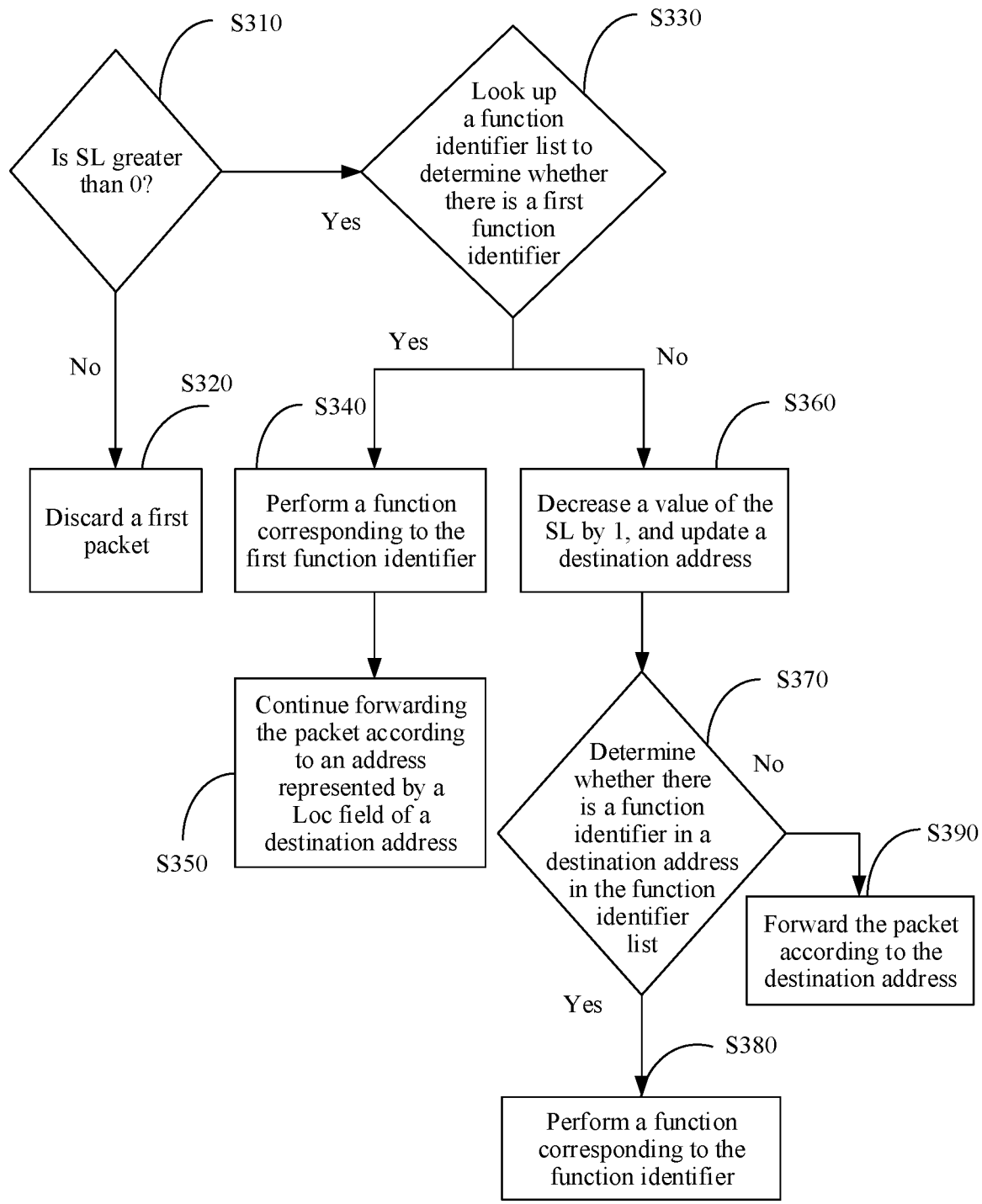
FIG. 5 is a schematic diagram of still another packet processing method according to an embodiment of the present disclosure.

In the second case, as shown in FIG. 5, the following process is included:

Operation S310. A first node determines whether a value of segments left (SL) in an SRH of a first packet is greater than 0.

Operation S320. If the value of the SL in the SRH is less than or equal to 0, and the current node is the last node, the current node does not need to forward the first packet, but discards the first packet.

Operation S330. If the value of the SL in the SRH is greater than 0, the first packet further needs to be forwarded to a next node, and the first node determines, through lookup based on a locally stored function identifier list, whether there is a first function identifier in a function SID. The function identifier list herein may also be referred to as a first correspondence, for example, may be in a form in Table 2.

Operation S340. If the first node determines, based on the locally stored function identifier list, that there is a first function identifier, and determines a function corresponding to the first function identifier, the first node performs the function. In addition, in this case, the value of the SL in the SRH of the first packet remains unchanged.

Operation S350. After S340 is performed, the first node continues forwarding the packet according to an address represented by an address segment (Loc segment) of a destination address in a packet header.

Operation S360. If the first node determines, based on the locally stored function identifier list, that there is no first function identifier, the first node decreases the value of the SL in the SRH by 1, and updates a destination address in a packet header to a SID to which the SL minus 1 points, that is, the SID to which the SL minus 1 points is the destination address.

Operation S370. The first node determines whether there is a function identifier of the SID in the destination address (the SID to which the SL minus 1 points) in the locally stored function identifier list.

Operation S380. If there is a function identifier of the SID in the destination address in the locally stored function identifier list in S370, perform a function corresponding to the function identifier.

Operation S390. If there is no function identifier of the SID in the destination address in the locally stored function identifier list in S370, forward the first packet according to the destination address.

It should be noted that in a network topology structure, each node may notify address information of the node, for example, address prefix information. To be specific, each node may notify address information corresponding to an address field of a SID in a SID list stored by the node. In this way, a node in the network topology structure may determine a node on a shortest path based on address information notified by another node. However, in the present disclosure, if a SID list locally stored by any node includes a shared SID, because an address field of the shared SID carries address information of a terminating node rather than address information of the node, the node does not need to notify the address information of the terminating node corresponding to the shared SID. Table 1 is used as an example. It is assumed that the first node locally stores Table 1. Loc1 and Loc2 are address prefixes of the first node, and Loc is an address field of a shared SID, that is, carries address information of a terminating node. Therefore, the first node notifies only Loc1 and Loc2, but does not notify Loc.

Therefore, in this embodiment of the present disclosure, if a plurality of nodes perform the same first function, the SRH of the first packet includes the shared SID, and the shared SID is used to replace a plurality of SIDs. In this way, a SID scale can be reduced to help save bandwidth resources, thereby improving system performance. If the SID scale decreases, a size of a SID stack decreases accordingly. This reduces the difficulty of reading the SID stack by an SP. Further, in the present disclosure, there may be no need to know in advance specific nodes that exist on the forwarding path, and a plurality of nodes may perform the corresponding first function by using one shared SID, thereby improving feasibility of packet forwarding.

With reference to FIG. 6 to FIG. 9, the following describes in detail the packet processing method in the embodiments of the present disclosure by using examples. That a node on a forwarding path can perform functions such as rate limiting, operation, administration and maintenance, or forwarding information base lookup is described in the following examples. However, this embodiment of the present disclosure is not limited thereto, and the node on the forwarding path may alternatively perform another function.

First Example

In the first example, an example is used for description in which a first function is rate limiting and a node on a forwarding path locally stores a SID list. In this example, some nodes on the forwarding path need to perform the rate limiting function. The foregoing first node may be any node on the forwarding path.

Figure 6:
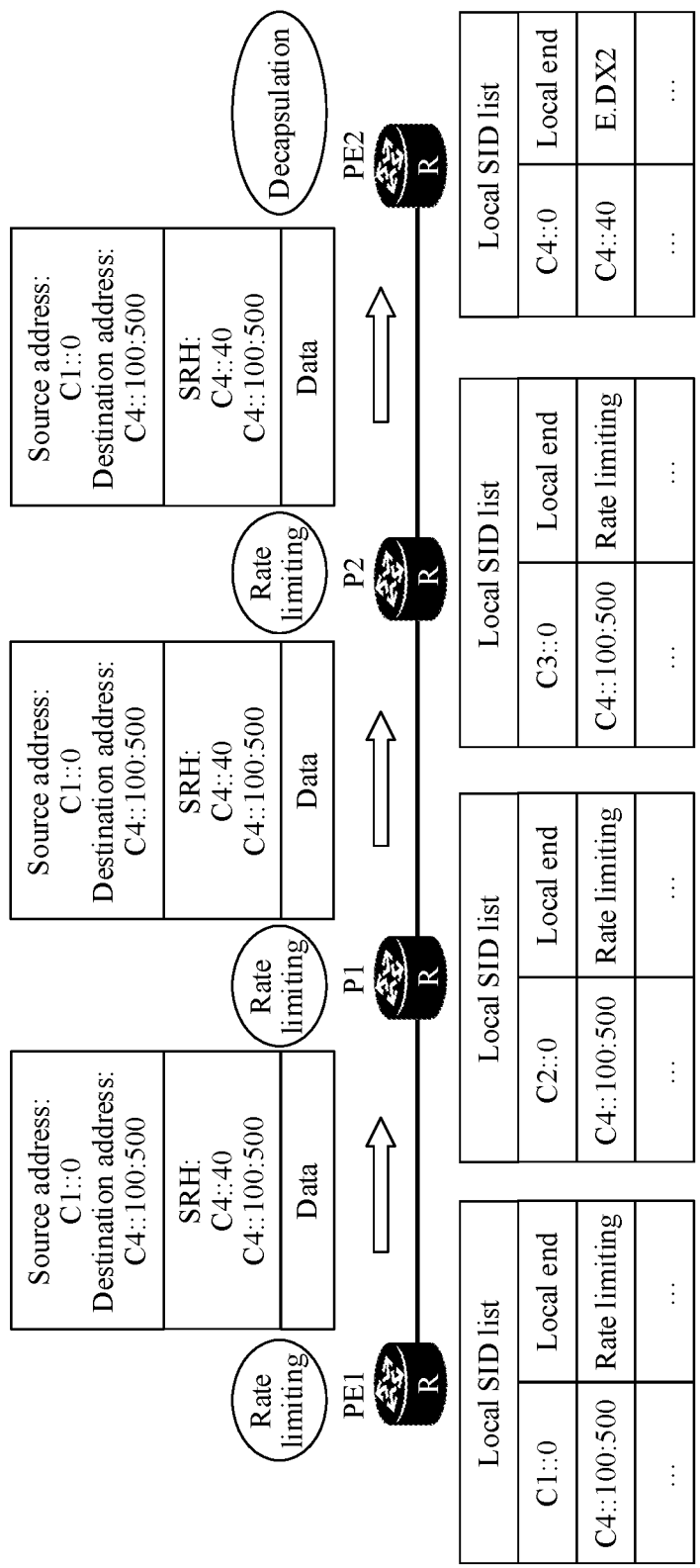
FIG. 6 is a schematic diagram of still another packet processing method according to an embodiment of the present disclosure.

In a network topology diagram shown in FIG. 6, a data stream enters from a PE1 node, successively passes through a P1 node and a P2 node, and finally arrives at a PE2 node. The PE1, P1, and P2 nodes need to perform the rate limiting function. An IPv6 address prefix of the PE1 node is C1::/64, an IPv6 address prefix of the P1 node is C2::/64, an IPv6 address prefix of the P2 node is C3::/64, and an IPv6 address prefix of the PE2 node is C4::/64.

In this example, a shared SID is C4::100:500. To be specific, a Loc field is C4 and has a length of 64 bits, and this means that an address prefix of a terminating node (the PE2) is C4::/64; and a Funct field is 100:500, has a length of 64 bits, and is an identifier of a network function that needs to be performed on a node along the path. 100 is an identifier of the rate limiting function, 500 is an Args field, that is, a parameter field, and means that a traffic rate is limited to 500 kB/s, and the identifier of the function and a parameter are combined as the Funct field.

A local SID list on the PE1 node stores a SID such as C1::0. A function corresponding to the SID is a "local end", and is a most basic function, that is, represents a local endpoint. Similarly, local SID lists of the P1 node, the P2 node, and the PE2 node also store corresponding SIDs, and the corresponding SIDs are respectively C2::0, C3::0, and C4::0. Functions corresponding to the SIDs represent a local endpoint. In addition, the PE2 node stores C4::40, and a function corresponding to C4::40 is "E.DX2 (End.DX2)". The function means removing an outer SRv6 header (including an outer IPv6 header and an SRH) and performing layer 2 forwarding. This function is specific to an SRv6 egress node, and is used to remove SRv6 encapsulation and restore original IPv6 data. In addition, the PE1 node, the P1 node, and the P2 node each store the shared SID, that is, C4::100:500. The PE1 node, the P1 node, and the P2 node need to perform rate limiting during forwarding of a data stream on the local nodes, and a traffic rate is limited to 500 kB/s.

The PE1 node, the P1 node, the P2 node, and the PE2 node each need to notify a SID address prefix in a local SID list to another node. An address prefix of the shared SID is notified only by the terminating node (the PE2). A local SID list of another node includes the shared SID, but the another node does not notify the address prefix of the shared SID. To be specific, the PE1 node notifies an address prefix C1::/64, the P1 node notifies an address prefix C2::/64, the P2 node notifies an address prefix C3::/64, and the PE2 node notifies an address prefix C4::/64.

The PE1 node encapsulates an SRv6 packet header of a packet. First, an SRH is constructed, the shared SID is carried at a stack top of a SID stack of the SRH, and the SID of the PE2 is carried after the shared SID, that is, content of the SRH is C4::100:500 and C4::40. According to a rule for generating a destination address in an outer IPv6 packet header of SRv6, the SID at the stack top of the SRH, that is, the shared SID, is copied to a destination address field of the packet as a destination address of the SRv6 packet. In this case, the destination address field is C4::100:500.

After the PE1 node encapsulates the SRv6 packet header of the packet, first, whether C4::100:500 in the destination address field matches the local SID list of the PE1 is determined through lookup. If a lookup result is that C4::100:500 in the destination address field matches the local SID list of the PE1, the PE1 node needs to perform the rate limiting function based on the shared SID, and a traffic rate is limited to 500 kB/s. Table lookup is performed on the PE1 based on the Loc field in the shared SID, that is, C4::/64, for packet forwarding.

After the packet arrives at the P1 node, first, whether C4::100:500 in the destination address field matches the local SID list of the P1 is determined through lookup. If a lookup result is that C4::100:500 in the destination address field matches the local SID list of the P1, the P1 node needs to perform the rate limiting function based on the shared SID, and a traffic rate is limited to 500 kB/s. Table lookup is performed on the P1 based on the Loc field in the shared SID, that is, C4::/64, for packet forwarding.

After the packet arrives at the P2 node, first, whether C4::100:500 in the destination address field matches the local SID list of the P2 is determined through lookup. If a lookup result is that C4::100:500 in the destination address field matches the local SID list of the P2, the P2 node needs to perform the rate limiting function based on the shared SID, and a traffic rate is limited to 500 kB/s. Table lookup is performed on the P2 based on the Loc field in the shared SID, that is, C4::/64, for packet forwarding.

After the packet arrives at the PE2 node, first, whether C4::100:500 in the destination address field matches the local SID list of the PE2 is determined through lookup. If a lookup result is that C4::100:500 in the destination address field does not match the local SID list of the PE2, a value of an SL is decreased by 1, and a SID that is corresponding to a new SL and that is in the SRH, that is, C4::40, is copied to the destination address field. Then, whether C4::40 in the destination address field matches the local SID list is determined through lookup. If a lookup result is that C4::40 in the destination address field matches the local SID list, the PE2 node needs to remove the outer SRv6 header of the packet and performs layer 2 forwarding. To be specific, the PE2 node is an egress node and removes SRv6 encapsulation.

Second Example

In the second example, an example is used for description in which a first function is inband operation, administration, and maintenance (iOAM) and a node on a forwarding path locally stores a SID list. In this example, some nodes on the forwarding path need to perform the iOAM function. The foregoing first node may be any node on the forwarding path.

Figure 7:
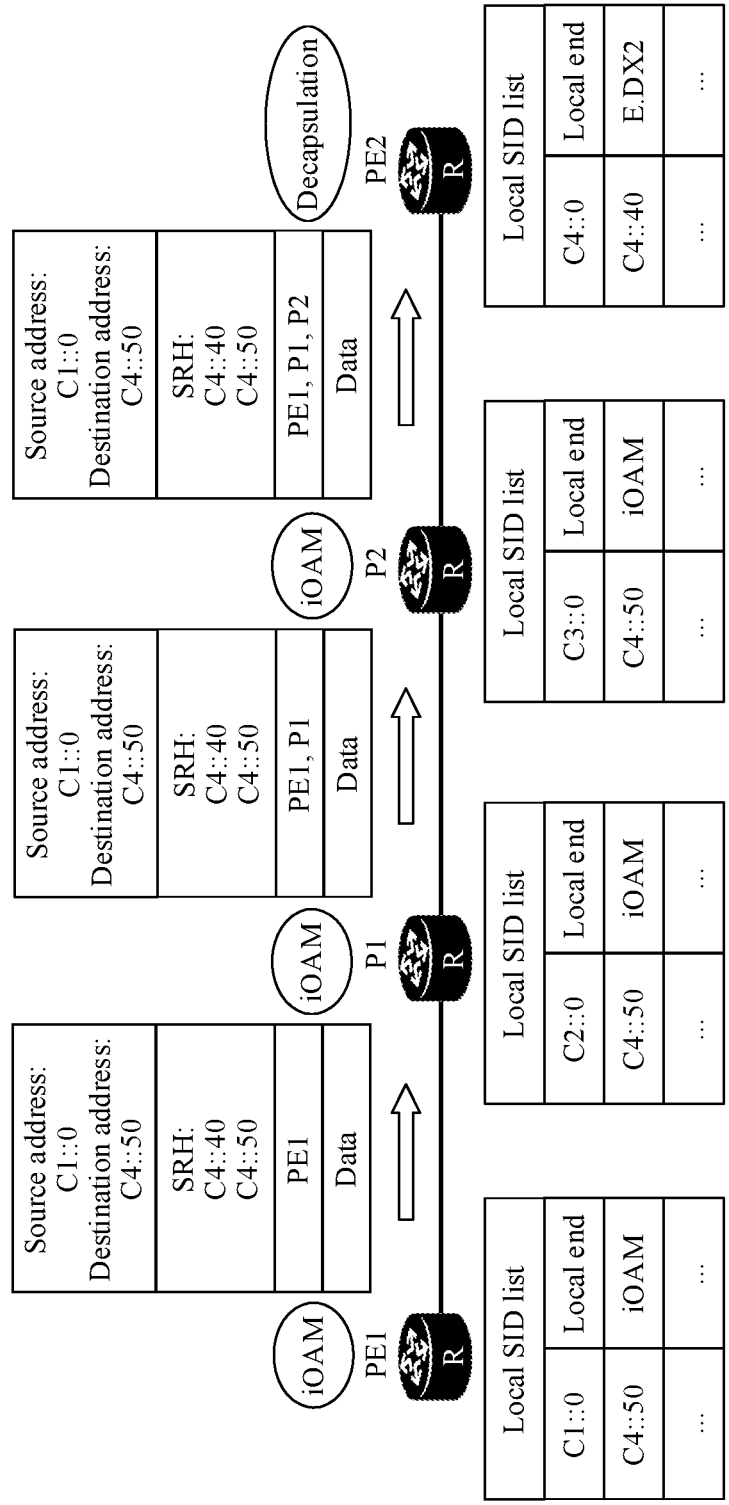
FIG. 7 is a schematic diagram of still another packet processing method according to an embodiment of the present disclosure.

In a network topology diagram shown in FIG. 7, a data stream enters from a PE1 node, successively passes through a P1 node and a P2 node, and finally arrives at a PE2 node. The PE1, P1, and P2 nodes need to perform the inband OAM function. An IPv6 address prefix of the PE1 node is C1::/64, an IPv6 address prefix of the P1 node is C2::/64, an IPv6 address prefix of the P2 node is C3::/64, and an IPv6 address prefix of the PE2 node is C4::/64.

In this embodiment, a shared SID is C4::50. To be specific, a Loc field is C4 and has a length of 64 bits, and this means that an address prefix of a terminating node (the PE2) is C4::/64; and a Funct field is 50, has a length of 64 bits, and is an identifier of a network function that needs to be performed on a node along the path. 50 is an identifier of the inband OAM function, and a local node identifier of the node is recorded in a packet.

A local SID list on the PE1 node stores a SID such as C1::0. A function corresponding to the SID is a "local end", and is a most basic function, that is, represents a local endpoint. Similarly, local SID lists of the P1 node, the P2 node, and the PE2 node also store corresponding SIDs, and the corresponding SIDs are respectively C2::0, C3::0, and C4::0. Functions corresponding to the SIDs represent a local endpoint. In addition, the PE2 node stores C4::40, and a function corresponding to C4::40 is "E.DX2 (End.DX2)". The function means removing an outer SRv6 header (including an outer IPv6 header and an SRH) and performing layer 2 forwarding. This function is specific to an SRv6 egress node, and is used to remove SRv6 encapsulation and restore original IPv6 data. In addition, the PE1 node, the P1 node, and the P2 node each store the shared SID, that is, C4::50. The PE1 node, the P1 node, and the P2 node need to perform inband OAM during forwarding of a data stream on the nodes, and local node identifiers of the nodes are recorded in the packet.

The PE1 node, the P1 node, the P2 node, and the PE2 node each need to notify a SID address prefix in a local SID list to another node. An address prefix of the shared SID is notified only by the terminating node. A local SID list of another node includes the shared SID but the another node does not notify the address prefix of the shared SID. To be specific, the PE1 node notifies an address prefix C1::/64, the P1 node notifies an address prefix C2::/64, the P2 node notifies an address prefix C3::/64, and the PE2 node notifies an address prefix C4::/64.

The PE1 node encapsulates an SRv6 packet header of a packet. First, an SRH is constructed, the shared SID is carried at a stack top of a SID stack of the SRH, and the SID of the PE2 is carried after the shared SID, that is, content of the SRH is C4::50 and C4::40. According to a rule for generating a destination address in an outer IPv6 packet header of SRv6, the SID at the stack top of the SRH, that is, the shared SID, is copied to a destination address field of the packet as a destination address of the SRv6 packet. In this case, the destination address field is C4::50.

After the PE1 node encapsulates the SRv6 packet header of the packet, first, whether C4::50 in the destination address field matches the local SID list of the PE1 is determined through lookup. If a lookup result is that C4::50 in the destination address field matches the local SID list of the PE1, the PE1 node needs to perform the inband OAM function based on the shared SID, and the local node identifier of the node is recorded in the packet. Table lookup is performed on the PE1 based on the Loc field in the shared SID, that is, C4::/64, for packet forwarding.

After the packet arrives at the P1 node, first, whether C4::50 in the destination address matches the local SID list of the P1 is determined through lookup. If a lookup result is that C4::50 in the destination address matches the local SID list of the P1, the P1 node needs to perform the inband OAM function based on the shared SID, and the local node identifier of the node is recorded in the packet. Table lookup is performed on the P1 based on the Loc field in the shared SID, that is, C4::/64, for packet forwarding.

After the packet arrives at the P2 node, first, whether C4::50 in the destination address field matches the local SID list of the P2 is determined through lookup. If a lookup result is that C4::50 in the destination address field matches the local SID list of the P2, the P2 node needs to perform the inband OAM function based on the shared SID, and the local node identifier of the node is recorded in the packet. Table lookup is performed on the P2 based on the Loc field in the shared SID, that is, C4::/64, for packet forwarding.

After the packet arrives at the PE2 node, first, whether C4::50 in the destination address field matches the local SID list of the PE2 is determined through lookup. If a lookup result is that C4::50 in the destination address field does not match the local SID list of the PE2, a value of an SL is decreased by 1, and a SID that is corresponding to a new SL and that is in the SRH, that is, C4::40, is copied to the destination address field. Then, whether C4::40 in the destination address field matches the local SID list is determined through lookup. If a lookup result is that C4::40 in the destination address field matches the local SID list, the PE2 node needs to remove the outer SRv6 header of the packet and performs layer 2 forwarding. To be specific, the PE2 node is an egress node and removes SRv6 encapsulation. In addition, node identifiers (for example, PE1, P1, and P2 in FIG. 7) of nodes through which a packet forwarding path passes may be extracted from the SRv6 packet header, to obtain the accurate forwarding path on which the nodes are located, for network diagnosis and the like.

Third Example

In the third example, an example is used for description in which a first function is forwarding information base (FIB) lookup and a node on a forwarding path locally stores a SID list. In this example, some nodes on the forwarding path need to perform the forwarding information base lookup function. The foregoing first node may be any node on the forwarding path.

Figure 8:
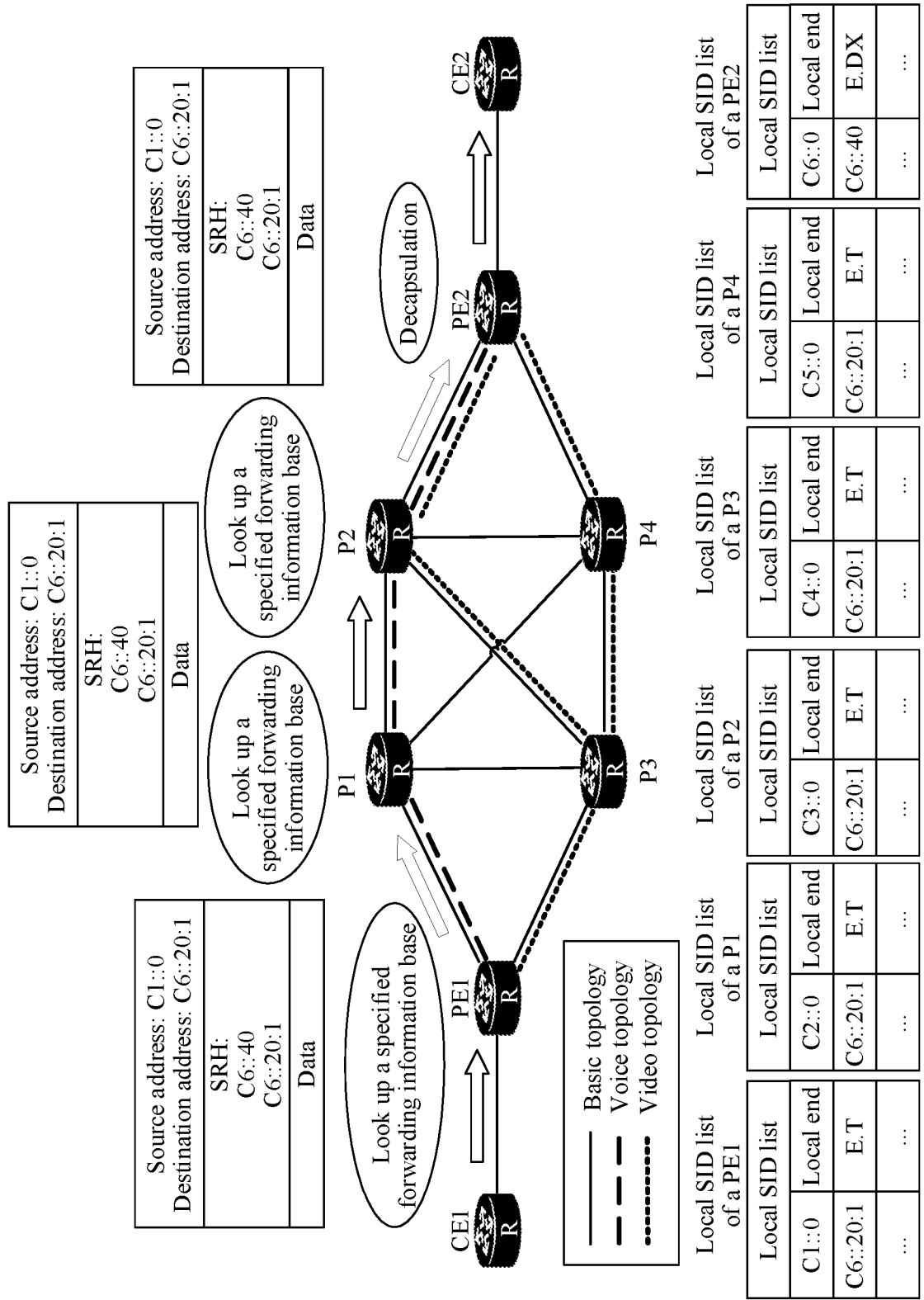
FIG. 8 is a schematic diagram of still another packet processing method according to an embodiment of the present disclosure.

In a network topology diagram shown in FIG. 8, every two of a P1 node, a P2 node, a P3 node, and a P4 node are connected to each other, a PE1 node is connected to the P1 node and the P3 node, a PE2 node is connected to the P2 node and the P4 node, a CE1 node is connected to the PE1 node, and a CE2 node is connected to the PE2 node. A data stream enters from the PE1 node and flows out from the PE2 node. Different FIBs are applicable to different types of data streams (a voice data stream and a video data stream are used as an example in this embodiment) on the PE1 node, the PE2 node, the P1 node, the P2 node, the P3 node, and the P4 node and the different types of data streams are corresponding to different topologies. An IPv6 address prefix of the PE1 node is C1::/64, an IPv6 address prefix of the P1 node is C2::/64, an IPv6 address prefix of the P2 node is C3::/64, an IPv6 address prefix of the P3 node is C4::/64, an IPv6 address prefix of the P4 node is C5::/64, and an IPv6 address prefix of the PE2 node is C6::/64.

In this embodiment, a shared SID is C6::20:1. To be specific, a Loc field is C6 and has a length of 64 bits, and this means that an address prefix of a destination node is C6::/64; and a Funct field is 20:1, has a length of 64 bits, and is an identifier of a network function that needs to be performed on a node along the path. 20 is an identifier of a function of looking up a specified forwarding information base. In the present disclosure, the function of looking up a specified forwarding information base is represented by "E.T"; 1 is an arg field, that is, a parameter field, and indicates a specific FIB to be looked up; and 1 indicates an FIB corresponding to a voice data stream topology, and a function identifier and a parameter are combined as the Funct field.

A local SID list on the PE1 node stores a SID such as C1::0. A function corresponding to the SID is a "local end (End)", and is a most basic function, that is, represents a local endpoint. Similarly, local SID lists of the P1 node, the P2 node, the P3 node, the P4 node, and the PE2 node also store corresponding SIDs, and the corresponding SIDs are respectively C2::0, C3::0, C4::0, C5::0, and C6::0. Functions corresponding to the SIDs represent a local endpoint. In addition, the PE2 node stores C6::40, and a function corresponding to C6::40 is "End.DX2". The function means removing an outer SRv6 header (including an outer IPv6 header and an SRH) and performing layer 2 forwarding. This function is specific to an SRv6 egress node, and is used to remove SRv6 encapsulation and restore an original IPv6 packet. In addition, the PE1 node, the P1 node, the P2 node, the P3 node, and the P4 node each store the shared SID, that is, C6::20:1, the PE1 node, the P1 node, the P2 node, the P3 node, and the P4 node need to look up a specified forwarding information base during forwarding of a data stream on the local nodes. The specified forwarding information base is FIB_1, that is, an FIB corresponding to a voice data stream topology.

The PE1 node, the P1 node, the P2 node, the P3 node, the P4 node, and the PE2 node each need to notify a SID address prefix in a local SID list to another node. An address prefix of the shared SID is notified only by the destination node. A local SID list of another node includes the shared SID but the another node does not notify the address prefix of the shared SID. To be specific, the PE1 node notifies an address prefix C1::/64, the P1 node notifies an address prefix C2::/64, the P2 node notifies an address prefix C3::/64, the P3 node notifies an address prefix C4::/64, the P4 node notifies an address prefix C5::/64, and the PE2 node notifies an address prefix C6::/64.

The PE1 node encapsulates an SRv6 packet header of a packet. First, an SRH is constructed, the shared SID is carried at a stack top of a SID stack of the SRH, and the SID of the PE2 is carried after the shared SID, that is, content of the SRH is C6::20:1 and C6::40. According to a rule for generating a destination address in an outer IPv6 packet header of SRv6, the SID at the stack top of the SRH, that is, the shared SID, is copied to a destination address field of the packet as a destination address of the SRv6 packet. In this case, the destination address field is C6::20:1.

After the PE1 node encapsulates the SRv6 packet header of the packet, first, whether C6::20:1 in the destination address field matches the local SID list of the PE1 is determined through lookup. If a lookup result is that C6::20:1 in the destination address field matches the local SID list of the PE1, the PE1 node needs to perform, based on the shared SID, the function of looking up a specified forwarding information base, and an FIB to be looked up is an FIB corresponding to a voice data stream topology. FIB_1 is looked up on the PE1 based on the Loc field in the shared SID, that is, C6::/64, for packet forwarding.

According to a topology corresponding to a voice data stream, after the packet arrives at the P1 node, first, whether C6::20:1 in the destination address field matches the local SID list of the P1 is determined through lookup. If a lookup result is that C6::20:1 in the destination address field matches the local SID list of the P1, the P1 node needs to perform, based on the shared SID, the function of looking up a specified forwarding information base, and an FIB to be looked up is an FIB corresponding to the voice data stream topology. An FIB_1 table is looked up on the P1 based on the Loc field in the shared SID, that is, C6::/64, for packet forwarding.

According to a topology corresponding to a voice data stream, after the packet arrives at the P2 node, first, whether C6::20:1 in the destination address field matches the local SID list of the P2 is determined through lookup. If a lookup result is that C6::20:1 in the destination address field matches the local SID list of the P2, the P2 node needs to perform, based on the shared SID, the function of looking up a specified forwarding information base, and an FIB to be looked up is an FIB corresponding to the voice data stream topology. An FIB_1 table is looked up on the P1 based on the Loc field in the shared SID, that is, C6::/64, for packet forwarding.

After the packet arrives at the PE2 node, first, whether C6::20:1 in the destination address field matches the local SID list of the PE2 is determined through lookup. If a lookup result is that C6::20:1 in the destination address field does not match the local SID list of the PE2, a value of an SL is decreased by 1, and a SID that is corresponding to a new SL and that is in the SRH, that is, C6::40, is copied to the destination address field. Then, whether C6::40 in the destination address field matches the local SID list is determined through lookup. If a lookup result is that C6::40 in the destination address field matches the local SID list, the PE2 node needs to remove the outer SRv6 header of the packet and performs layer 2 forwarding. To be specific, the PE2 node is an egress node and removes SRv6 encapsulation.

Fourth Example

Figure 9:
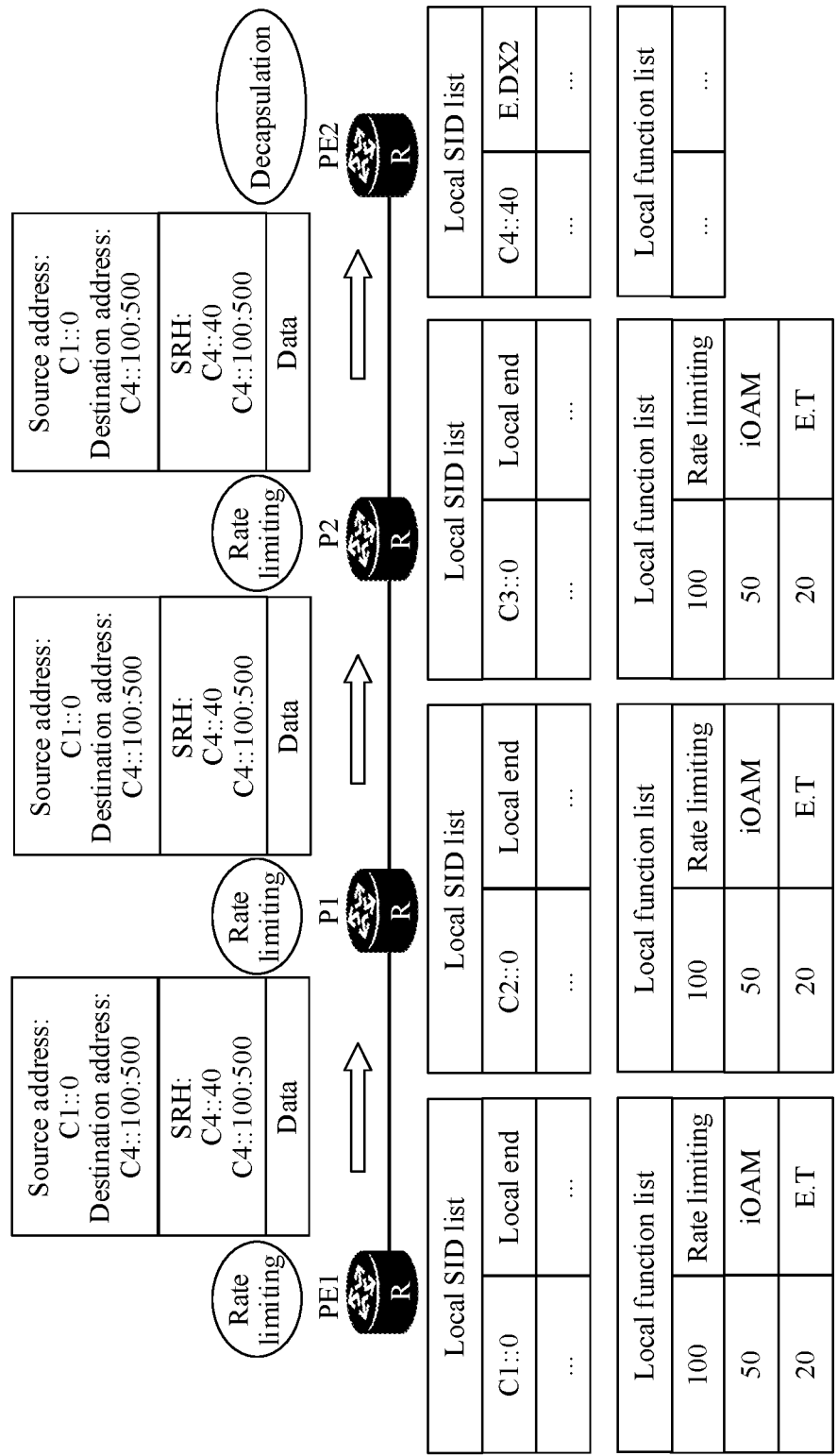
FIG. 9 is a schematic diagram of still another packet processing method according to an embodiment of the present disclosure.

In the fourth example, an example is used for description in which a first function is rate limiting and a node on a forwarding path locally stores a function identifier list. The function identifier list is locally stored on the node. For example, the function identifier list is listed in Table 2. Content of the list is an identification code of a network function that can be supported by the node and that needs to be performed by a node along the path. The identification code should be a unified identification code on an entire network, that is, a unified identification code on the entire network should be defined for each network function, as listed in Table 2. For example, an identification code of rate limiting is 100, an identification code of OAM is 50, and an identification code of looking up a specified forwarding information base (E.T) is 20. Some network functions such as decapsulation are unsuitable for being performed on a node along the path. As shown in FIG. 9, a local SID list on the PE1 node stores a SID such as C1::0. A function corresponding to the SID is a "local end", and is a most basic function, that is, represents a local endpoint. Similarly, local SID lists of the P1 node and the P2 node also store corresponding SIDs, and the corresponding SIDs are respectively C2::0 and C3::0. Functions corresponding to the SIDs represent a local endpoint. In addition, the PE2 node stores C4::40, and a function corresponding to C4::40 is "E.DX2". The function means removing an outer SRv6 header (including an outer IPv6 header and an SRH) and performing layer 2 forwarding. This function is specific to an SRv6 egress node, and is used to remove SRv6 encapsulation and restore an original IPv6 packet.

The PE1 node, the P1 node, the P2 node, and the PE2 node each need to notify a SID address prefix in a local SID list to another node. To be specific, the PE1 node notifies an address prefix C1::/64, the P1 node notifies an address prefix C2::/64, the P2 node notifies an address prefix C3::/64, and the PE2 node notifies an address prefix C4::/64.

The PE1 node, the P1 node, the P2 node, and the PE2 node each maintain a local function list and notify another node of the local function list through the IGP. Content of the local function lists of the PE1 node, the P1 node, and the P2 node is identification codes of rate limiting, iOAM, and E.T, that is, 100, 50, and 20.

As shown in FIG. 9, a data stream enters from a PE1 node, successively passes through a P1 node and a P2 node, and finally arrives at a PE2 node. The PE1, P1, and P2 nodes need to perform the rate limiting function. An IPv6 address prefix of the PE1 node is C1::/64, an IPv6 address prefix of the P1 node is C2::/64, an IPv6 address prefix of the P2 node is C3::/64, and an IPv6 address prefix of the PE2 node is C4::/64.

The PE1 node encapsulates an SRv6 packet header of a packet. First, an SRH is constructed, in a SID at a stack top of the SRH, a Loc field is the address prefix of the PE2 node; and a Funct field is an identification code 100 of a rate limiting function, and carries an arg field, that is, a parameter field 500, indicating that a traffic rate is limited to 500 kB/s. A SID in a local SID list of the PE2 is carried after the SID at the stack top, that is, content of the SRH is C4::100:500 and C4::40. According to a rule for generating a destination address in an outer IPv6 packet header of SRv6, the SID at the stack top of the SRH is copied to a destination address field of the packet as a destination address of the SRv6 packet. In this case, the destination address field is C4::100:500.

After the PE1 node encapsulates the SRv6 packet header of the packet, first, whether a Funct field 100 in C4::100:500 in the destination address matches a local function list is determined through lookup. If a lookup result is that the Funct field 100 in C4::100:500 in the destination address matches the local function list, the rate limiting function needs to be performed on a data stream along the path, and the PE1 node supports the rate limiting function. A traffic rate is limited to 500 kB/s. Table lookup is performed on the PE1 based on a Loc field in a shared SID, that is, C4::/64, for packet forwarding.

After the packet arrives at the P1 node, first, whether the Funct field 100 in C4::100:500 in the destination address matches a local function list is determined through lookup. If a lookup result is that the Funct field 100 in C4::100:500 in the destination address matches the local function list, that is, the rate limiting function needs to be performed on a data stream along the path, and the P1 node supports the rate limiting function. A traffic rate is limited to 500 kB/s. Table lookup is performed on the P1 based on the Loc field in the shared SID, that is, C4::/64, for packet forwarding.

After the packet arrives at the P2 node, first, whether the Funct field 100 in C4::100:500 in the destination address matches a local function list is determined through lookup. If a lookup result is that the Funct field 100 in C4::100:500 in the destination address matches the local function list, the rate limiting function needs to be performed on a data stream along the path, and the P2 node supports the rate limiting function. A traffic rate is limited to 500 kB/s. Table lookup is performed on the P2 based on the Loc field in the shared SID, that is, C4::/64, for packet forwarding.

After the packet arrives at the PE2 node, first, whether the Funct field 100 in C4::100:500 in the destination address matches a local function list is determined through lookup. If a lookup result is that the Funct field 100 in C4::100:500 in the destination address does not match the local function list, a value of an SL is decreased by 1, and a SID that is corresponding to a new SL and that is in the SRH, that is, C4::40, is copied to the destination address field. Then, whether C4::40 in the destination address field matches the local SID list is determined through lookup. If a lookup result is that C4::40 in the destination address field matches the local SID list, the PE2 node needs to remove the outer SRv6 header of the packet and performs layer 2 forwarding. To be specific, the PE2 node is an egress node and removes SRv6 encapsulation.

In the fourth example, when the Funct field part in the SID (the destination address SID) at the stack top of the SRH of the packet is replaced with 50, a function similar to the inband OAM function in the second example can be implemented; or when the Funct field part in the SID at the stack top of the SRH of the packet is replaced with 20, a function similar to the function of looking up a specified forwarding information base in the third example can be implemented.

Figure 10:
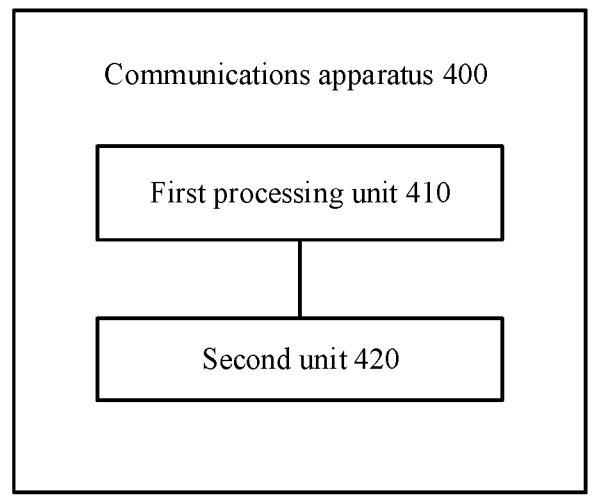
FIG. 10 is a schematic block diagram of a packet processing apparatus according to an embodiment of the present disclosure.
Figure 11:
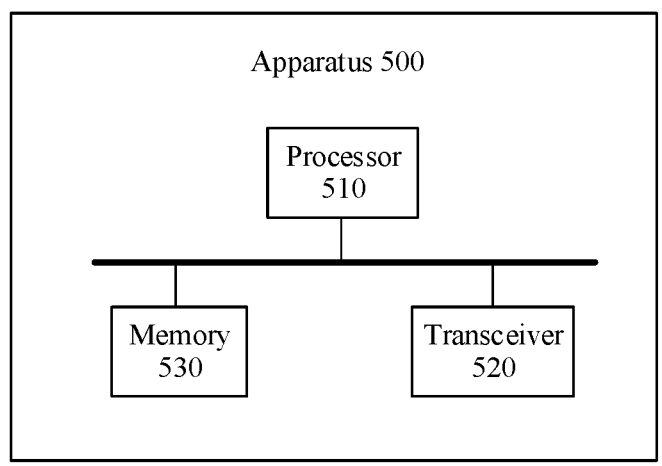
FIG. 11 is a schematic block diagram of another packet processing apparatus according to an embodiment of the present disclosure.

With reference to FIG. 1 to FIG. 9, the foregoing describes in detail the packet processing method provided in the embodiments of the present disclosure. With reference to FIG. 10 and FIG. 11, the following describes in detail a packet processing apparatus provided in the embodiments of the present disclosure.

FIG. 10 is a schematic block diagram of a packet processing apparatus 400 according to an embodiment of the present disclosure. The apparatus 400 may be corresponding to the first node described in the foregoing method, or may be corresponding to a chip or a component of the first node. Modules or units in the apparatus 400 may be configured to perform actions or processing processes performed by the first node in the foregoing method. As shown in FIG. 10, the packet processing apparatus 400 may include a first processing unit 410 and a second processing unit 420.

The first processing unit 410 is configured to determine a first packet, where both a packet header and a segment routing header (SRH) of the first packet include a shared segment identifier (SID), the shared SID includes a first address identifier and a first function identifier, the first address identifier is used to identify address information of a terminating node, and the first function identifier is used to identify a same first function that needs to be performed by at least two nodes.

The second processing unit 420 is configured to determine, based on a first correspondence and the first function identifier, to perform the first function, where the first correspondence is used to indicate that at least one function identifier is in a one-to-one correspondence with at least one function.

In one embodiment, the first correspondence is specifically used to indicate that at least one SID is in a one-to-one correspondence with the at least one function, and the at least one SID includes the shared SID.

The second processing unit 420 is specifically configured to determine, based on the first correspondence and the shared SID, to perform the first function.

In one embodiment, the second processing unit 420 is specifically configured to:

determine whether there is the first function identifier in the first correspondence; and if there is the first function identifier in the first correspondence, determine, based on the first correspondence and the first function identifier, to perform the first function.

In one embodiment, the first processing unit 410 or the second processing unit 420 is further configured to: if there is the first function identifier in the first correspondence, determine that a value of segments left (SL) in the SRH remains unchanged.

In one embodiment, the second processing unit 420 is specifically configured to determine whether the value of the segments left (SL) in the SRH is greater than 0; and if the value of the SL is greater than 0, determine whether there is the first function identifier in the first correspondence.

In one embodiment, the first function is rate limiting, operation, administration, and maintenance, or forwarding information base lookup.

In one embodiment, the apparatus further includes:

a first transceiver unit, configured to: after it is determined, based on the local first correspondence and the first function identifier, to perform the first function, forward the first packet to a second node according to a shortest path, where the at least two nodes include the apparatus and the second node.

In one embodiment, if the apparatus is a source node, the apparatus further includes:

a second transceiver unit, configured to receive encapsulation configuration information sent by a controller, where the encapsulation configuration information includes the shared SID; and the first processing unit is specifically configured to generate and encapsulate the first packet based on the encapsulation configuration information.

In one embodiment, if the apparatus is a terminating node, the apparatus further includes:

a third transceiver unit, configured to receive the first packet sent by a previous-hop node; and the first processing unit or the second processing unit is further configured to: after it is determined, based on the first correspondence and the first function identifier, to perform the first function, decapsulate the first packet.

It should be understood that for a specific process in which the units in the apparatus 400 perform the foregoing corresponding operations, refer to the foregoing description about the method embodiments described with reference to FIG. 1 to FIG. 9. For brevity, details are not described herein again.

The apparatus 400 in the foregoing solution has a function of performing corresponding operations performed by the first node in the foregoing method. The function may be implemented by using hardware, or may be implemented by hardware executing corresponding software. The hardware or software includes one or more modules corresponding to the foregoing function. For example, a sending unit may be replaced with a transmitter, a receiving unit may be replaced with a receiver, and another unit such as a determining unit may be replaced with a processor, to implement sending and receiving operations and related processing operations in each method embodiment.

In a specific implementation process, the processor may be configured to perform, for example, but not limited to, baseband related processing, and the transceiver may be configured to perform, for example, but not limited to, radio frequency sending and receiving. The foregoing components may be separately disposed on chips independent of each other, or at least some or all of the components may be disposed on a same chip. For example, the processor may be further classified into an analog baseband processor and a digital baseband processor. The analog baseband processor and the transceiver may be integrated into a same chip, and the digital baseband processor may be disposed on a stand-alone chip. With continuous development of integrated circuit technologies, increasing components can be integrated into a same chip. For example, the digital baseband processor and a plurality of types of application processors (for example, but not limited to, a graphics processor and a multimedia processor) may be integrated into a same chip. Such a chip may be referred to as a system on a chip (SOC). Whether all components are separately disposed in different chips or integrated into one or more chips usually depends on a specific requirement of a product design. Specific implementation forms of the foregoing components are not limited in the embodiments of the present disclosure.

It can be understood that the processor in the foregoing embodiments may implement a function in any design in the foregoing embodiments of the present disclosure by executing a program instruction by a hardware platform provided with a processor and a communications interface. Based on this, as shown in FIG. 11, an embodiment of the present disclosure provides a schematic block diagram of a packet processing apparatus 500. The apparatus 500 includes a processor 510, a transceiver 520, and a memory 530. The processor 510, the transceiver 520, and the memory 530 communicate with each other through an internal connection path. The memory 530 is configured to store an instruction. The processor 510 is configured to execute the instruction stored in the memory 530, to control the transceiver 520 to send a signal and/or receive a signal.

The processor 510 is configured to determine a first packet, where both a packet header and a segment routing header (SRH) of the first packet include a shared segment identifier (SID), the shared SID includes a first address identifier and a first function identifier, the first address identifier is used to identify address information of a terminating node, and the first function identifier is used to identify a same first function that needs to be performed by at least two nodes. The processor 510 is further configured to determine, based on a first correspondence and the first function identifier, to perform the first function, where the first correspondence is used to indicate that at least one function identifier is in a one-to-one correspondence with at least one function, and the at least one function includes the first function.

It should be understood that the apparatus in FIG. 10 in this embodiment of the present disclosure may be implemented by using the apparatus 500 in FIG. 11, and may be configured to perform operations and/or procedures corresponding to the first device in the foregoing method embodiments.

It can be understood that methods, procedures, operations, or operations in various designs described in the embodiments of the present disclosure can be implemented in a one-to-one correspondence manner through computer software, electronic hardware, or a combination of computer software and electronic hardware. Whether these functions are performed through hardware or software depends on a specific application and a design constraint of the technical solution. For example, in consideration of aspects such as software and hardware decoupling with good universality and low costs, these functions may be implemented by executing a program instruction. For another example, in consideration of aspects such as system performance and reliability, these functions may be implemented by using a dedicated circuit. For each particular application, a person of ordinary skill in the art may implement a described function by using a different method. This is not limited herein.

Based on the method provided in the embodiments of the present disclosure, the present disclosure further provides a computer program product. The computer program product includes computer program code, and when the computer program code is executed on a computer, the computer is enabled to perform the method in the foregoing embodiment. The embodiments of the present disclosure may alternatively be combined with each other.

Based on the method provided in the embodiments of the present disclosure, the present disclosure further provides a computer-readable medium. The computer-readable medium stores program code, and when the program code is run on a computer, the computer is enabled to perform the method in the foregoing embodiment.

It should be noted that the foregoing method embodiment of the present disclosure may be applied to a processor, or implemented by a processor. The processor may be an integrated circuit chip and has a signal processing capability. In an implementation process, operations in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field-programmable gate array (FPGA) or another programmable logic device, a discrete gate or transistor logic device, or a discrete hardware component. It may implement or perform the methods, the operations, and logical block diagrams that are disclosed in the embodiments of the present disclosure. The general purpose processor may be a microprocessor, or the processor may be any conventional processor or the like. Operations of the methods disclosed with reference to the embodiments of the present disclosure may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

It may be understood that the memory in the embodiments of the present disclosure may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. There are a plurality of different types of RAMs, for example, a static random access memory (static RAM, SRAM), a dynamic random access memory (dynamic RAM, DRAM), a synchronous dynamic random access memory (synchronous DRAM, SDRAM), and a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

The terms "first", "second", and the like in the present disclosure are merely intended to distinguish between different objects, but "first" and "second" do not limit an actual order or function of objects modified by "first" and "second". Any embodiment or design scheme described as an "exemplary" or "for example" in the embodiments of the present disclosure should not be explained as being more preferred or having more advantages than another embodiment or design scheme. Exactly, "for example" is used to present a concept in a specific manner.

In the present disclosure, a variety of objects that may appear, such as messages/information/devices/network elements/systems/apparatuses/operations are named. It can be understood that these specific names do not constitute any limitation on relevant objects, and the assigned names may vary with factors such as a scenario, a context, or a usage habit. Understanding of technical meanings of the technical terms in the present disclosure should be determined mainly based on functions and technical effects embodied/achieved by the technical terms in the technical solution.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet processing method, comprising:
determining, by a first node, a packet to be forwarded from the first node to a terminating node along a forwarding path, wherein the packet comprises a shared segment identifier (SID), wherein the shared SID is shared by the first node and one or more additional nodes on the forwarding path, and comprises an address identifier of the terminating node and a function identifier of a shared function to be performed by the first node, and the one or more additional nodes, wherein each of the first node and the one or more additional nodes comprises a correspondence between the shared SID and the shared function; and
determining, by the first node based on the correspondence on the first node and the shared SID, to perform the shared function.

2. The method according to claim 1, wherein the determining, by the first node based on the correspondence on the first node and the shared SID, to perform the shared function comprises:
determining, by the first node, whether there is the shared SID in the correspondence; and
when there is the shared SID in the correspondence, determining, by the first node based on the correspondence and the shared SID, to perform the shared function.

3. The method according to claim 2, wherein when there is the shared SID in the correspondence, the method further comprises:
determining, by the first node, that a value of segments left (SL) in a segment routing header (SRH) of the packet remains unchanged.

4. The method according to claim 2, wherein the determining, by the first node, whether there is the shared SID in the first correspondence comprises:
determining, by the first node, whether a value of segments left (SL) in a segment routing header (SRH) is greater than 0; and
when the value of the SL is greater than 0, determining, by the first node, whether there is the shared SID in the correspondence.

5. The method according to claim 1, wherein after the determining, by the first node based on the correspondence on the first node and the shared SID, to perform the shared function, the method further comprises:
forwarding, by the first node, the packet to a second node according to a shortest path, wherein the one or more additional nodes comprise the second node.

6. The method according to claim 5, wherein when the second node is the terminating node, the packet is decapsulated by the second node.

7. The method according to claim 1, wherein when the first node is a source node, the determining, by the first node, of the packet comprises:
receiving, by the first node, encapsulation configuration information sent by a controller, wherein the encapsulation configuration information comprises the shared SID; and
generating and encapsulating, by the first node, the packet based on the encapsulation configuration information.

8. A packet processing apparatus, comprising:
one or more processors;
a memory coupled to the one or more processors, and storing program instructions, which, when executed by the one or more processors, cause the one or more processors to perform operations comprising:
determining a packet to be forwarded from a first node to a terminating node along a forwarding path, wherein the packet comprises a shared segment identifier (SID), wherein the shared SID is shared by the first node and one or more additional nodes on the forwarding path, and comprises an address identifier of the terminating node and a function identifier of a shared function to be performed by the first node and the one or more additional nodes, wherein each of the first node and the one or more additional nodes includes a correspondence between the shared SID and the shared function; and
determining, based on the correspondence on the first node and the shared SID, to perform the shared function.

9. The apparatus according to claim 8, wherein the determining, by the first node, to perform the shared function comprises:
determining whether there is the shared SID in the correspondence; and
when there is the shared SID in the correspondence, determining, based on the correspondence and the shared SID, to perform the shared function.

10. The apparatus according to claim 9, wherein when there is the shared SID in the correspondence, determining that a value of segments left (SL) in a segment routing header (SRH) remains unchanged.

11. The apparatus according to claim 9, wherein the determining, by the first node, whether this is the shared SID in the correspondence comprises:
determining whether a value of segments left (SL) in a segment routing header (SRH) is greater than 0; and when the value of the SL is greater than 0, determining whether there is the shared SID in the correspondence.

12. The apparatus according to claim 8, wherein after the determining, based on the correspondence on the first node and the shared SID, to perform the shared function, forwarding the first packet to a second node according to a shortest path, wherein the one or more additional nodes comprise the second node.

13. The apparatus according to claim 8, wherein when the apparatus is a source node, the determining, by the first node, of the packet comprises:
   receiving encapsulation configuration information sent by a controller, wherein the encapsulation configuration information comprises the shared SID; and
   generating and encapsulating the packet based on the encapsulation configuration information.

14. The apparatus according to claim 12, wherein when the second node is the terminating node, the packet is decapsulated by the second node.

15. A non-transitory machine-readable medium having a computer program stored therein, wherein the computer program, when executed by a processor, causes the processor to perform operations comprising:
   determining, by a first node, a packet to be forwarded from the first node to a terminating node along a forwarding path, wherein the packet comprises a shared segment identifier (SID), wherein the shared SID is shared by the first node and one or more additional nodes on the forwarding path, and comprises an address identifier of the terminating node and a function identifier of a shared function to be performed by the first node, and the one or more additional nodes, wherein each of the first node and the one or more additional nodes comprises a correspondence between the shared SID and the shared function; and
   determining, by the first node based on the correspondence on the first node and the shared SID, to perform the shared function.

16. The non-transitory machine-readable medium according to claim 15, wherein the determining, by the first node based on the correspondence on the first node and the shared SID, to perform the shared function comprises:
   determining, by the first node, whether there is the shared SID in the correspondence; and
   when there is the shared SID in the correspondence, determining, by the first node based on the correspondence and the shared SID, to perform the shared function.

17. The non-transitory machine-readable medium according to claim 16, wherein when there is the shared SID in the correspondence, the operations further comprise:
   determining, by the first node, that a value of segments left (SL) in a segment routing header (SRH) of the packet remains unchanged.

18. The non-transitory machine-readable medium according to claim 16, wherein the determining, by the first node, whether there is the shared SID in the correspondence comprises:
   determining, by the first node, whether a value of segments left (SL) in a segment routing header (SRH) is greater than 0; and
   when the value of the SL is greater than 0, determining, by the first node, whether there is the shared SID in the correspondence.

19. The non-transitory machine-readable medium according to claim 15, wherein after the determining, by the first node based on the correspondence on the first node and the shared SID, to perform the shared function, the operations further comprise:
   forwarding, by the first node, the packet to a second node according to a shortest path, wherein the one or more additional nodes comprise the second node.

20. The non-transitory machine-readable medium according to claim 15, wherein when the first node is a source node, the determining, by the first node, the packet comprises:
   receiving, by the first node, encapsulation configuration information sent by a controller, wherein the encapsulation configuration information comprises the shared SID; and
   generating and encapsulating, by the first node, the packet based on the encapsulation configuration information.

* * * * *

UNITED STATES PATENT AND TRADEMARK OFFICE
CERTIFICATE OF CORRECTION

PATENT NO. : 11,349,754 B2
APPLICATION NO. : 17/002160
DATED : May 31, 2022
INVENTOR(S) : Li et al.

It is certified that error appears in the above-identified patent and that said Letters Patent is hereby corrected as shown below:

In the Claims

In Claim 4, Column 24, Line 3, delete "the first correspondence comprises:" and insert --the correspondence comprises:--.

Signed and Sealed this
Second Day of August, 2022

Katherine Kelly Vidal
*Director of the United States Patent and Trademark Office*